United States Patent [19]

Delricco

[11] Patent Number: 4,972,623
[45] Date of Patent: Nov. 27, 1990

[54] COLD ILLUMINATED FISHING JIG

[76] Inventor: James R. Delricco, 2249 N. Spaulding Ave., Chicago, Ill. 60647

[21] Appl. No.: 375,134

[22] Filed: Jul. 3, 1989

[51] Int. Cl.$^5$ .............................................. A01K 85/01
[52] U.S. Cl. ..................................... 43/17.6; 43/42.06
[58] Field of Search ..................... 43/17.6, 17.5, 42.06

[56] References Cited

U.S. PATENT DOCUMENTS

| | | |
|---|---|---|
| 1,325,530 | 12/1919 | Ore . |
| 2,482,721 | 9/1949 | Sigmundi . |
| 2,600,314 | 6/1952 | Miner . |
| 2,681,168 | 6/1954 | McMillion . |
| 2,764,979 | 10/1956 | Henderson . |
| 2,780,885 | 2/1957 | Callahan . |
| 2,787,858 | 4/1957 | Best . |
| 2,896,360 | 7/1959 | Lucas . |
| 2,940,208 | 6/1960 | Oswald . |
| 3,354,828 | 11/1967 | Shefler et al. . |
| 3,576,987 | 5/1971 | Voight . |
| 3,597,362 | 8/1971 | Bollyky . |
| 3,918,190 | 11/1975 | Hornbeck ............................ 43/17.6 |
| 4,221,069 | 9/1980 | Esses . |
| 4,245,420 | 1/1981 | Carr .................................. 43/42.06 |
| 4,505,063 | 3/1985 | Price et al. . |
| 4,554,756 | 11/1985 | Thomas . |
| 4,581,839 | 4/1986 | Matteson .............................. 43/17.6 |
| 4,610,103 | 9/1986 | Steinman ............................. 43/42.06 |
| 4,649,660 | 3/1987 | Kurka et al. . |
| 4,697,375 | 10/1987 | Mills . |
| 4,741,120 | 5/1988 | Cota et al. . |

Primary Examiner—Richard K. Seidel
Assistant Examiner—James Miner
Attorney, Agent, or Firm—Hill, Van Santen, Steadman & Simpson

[57] ABSTRACT

A cold illuminated fishing jig which comprises a hook with a flexible holder in which a ball of light emitting material can be detachably mounted. The lighted ball may be actuated by breaking a pellet containing a substance which is to be mixed with another substance within the ball to produce light or there may be a glass partition in the ball which is broken so as to mix the two material. Fiber optics fibers may extend from the light emitting ball to the hook. Also, a small ball may be covered with an luminous paint and surrounded with a glycerin translucent or transparent material which contains a gelatin type fish scent.

2 Claims, 1 Drawing Sheet

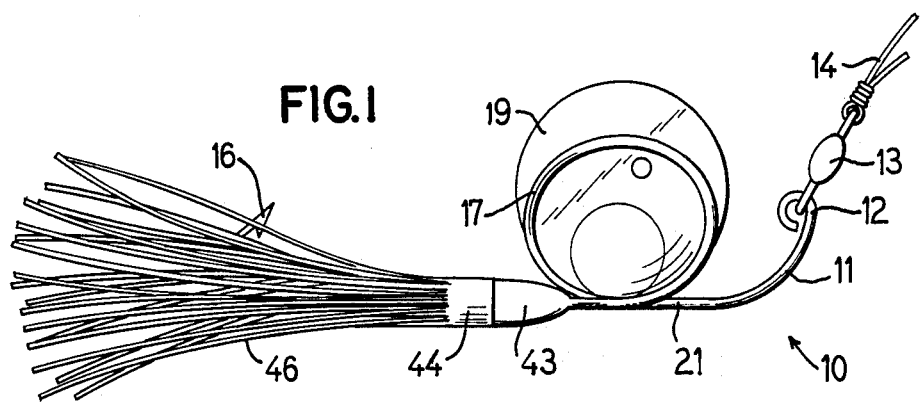
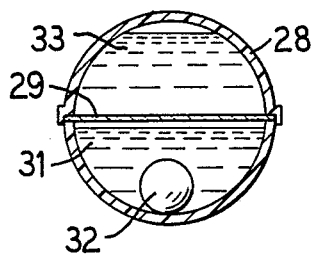
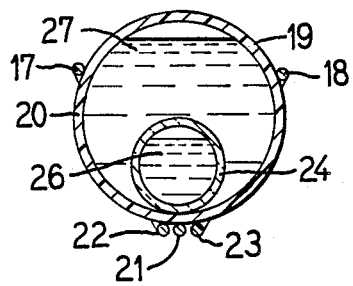
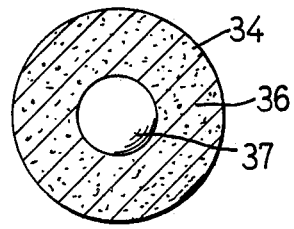
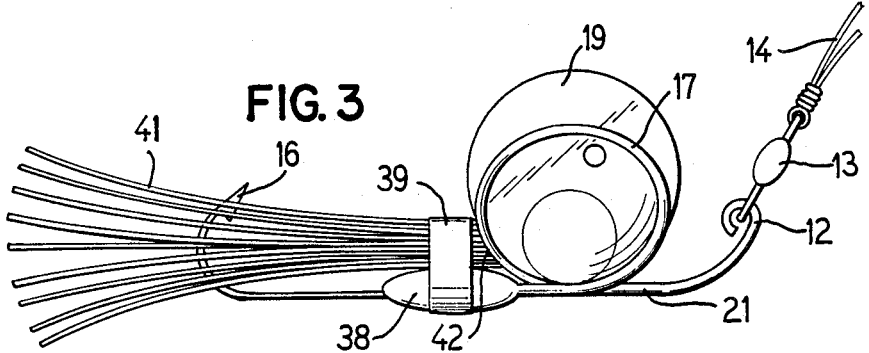
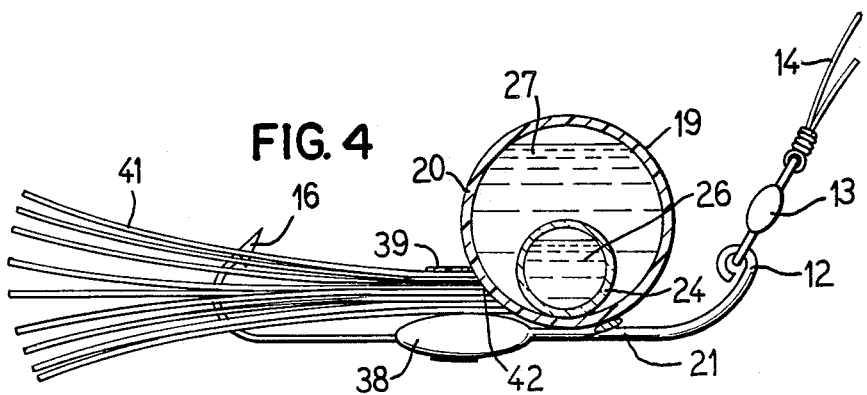

COLD ILLUMINATED FISHING JIG

BACKGROUND OF THE INVENTION

1. Field of the Invention

This invention relates in general to a cold-illuminated fishing jig and in particular to an improved fishing lure.

2. Description of Related Art

See for example, U. S. Pat. Nos. 3,597,362, 3,576,987, 3,704,809, 4,741,120, 2,681,168, 2,764,979, 2,780,885, 2,787,858, 2,896,360, 2,940,208, 3,354,828, 4,221,069, 4,505,063, 4,554,756, 4,649,660, 4,697,375, 3,576,987, 1,325,530 2,482,721 and 2,600,314. U.S. Pat. Nos. 3,576,987 and 3,597,362 disclose light emitting devices which are based upon mixing two substances which when combined emit visible light. The disclosure of these patents is hereby incorporated by reference.

SUMMARY OF THE INVENTION

It is an object of the present invention to provide a jig-type fishing lure with a flexible wire head to hold an easily removable chemically lighted pellet in various colors combined with the jig lure so as to attract and catch various species of fish. The chemically lighted pellet may be spherical in shape, for example, and can be easily replaced in the fishing jig so as to allow pellets which emit different colored light to be selectively replaced in the fishing jig. The brown pellet may consist of a plastic outer body filled with liquid or liquids made in various colors. Inside the round plastic outer body may be a thin glass inner pellet filled with a liquid or liquids such that when the glass inner pellet is broken by squeezing the plastic outer body, the liquids will mix to produce light radiation. The plastic outer body may be soft enough to squeeze and break the inner glass pellet and still retain its original shape.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a plan view of a first embodiment of the invention;

FIG. 2 is a sectional view through the light emitting ball of the invention;

FIG. 3 is a side view illustrating a modification of the invention;

FIG. 4 is a sectional view through the embodiment of FIg. 3;

FIG. 5 is a sectional view through a modified ball of the invention; and

FIG. 6 illustrates another modified form of the ball.

DESCRIPTION OF THE PREFERRED EMBODIMENTS

FIG. 1 illustrates the jig lure 10 of the invention which includes a fish hook with a first end 11 with an eye 12 to which a swivel 13 is connected. A line 14 can be connected to the swivel 13 as shown. The other end of the fish hook comprises a hook portion 16 as illustrated. Between the hook 16 and the end 11, is a mid-portion 21 which has two circular-shaped ring portions 17 and 18 into which a light emitting ball 19 can be detachably placed. In the embodiment illustrated in FIG. 1, an attaching member 43 is connected to the mid-portion 21 by a connector band 44 which attaches a plurality of metallic strips 46 to the fish hook so that the strips can camouflage the hook 16. The ball 19 is shown in FIG. 2 and comprises a spherical outer plastic shell 20 which is transparent or translucent which contains a first liquid 27. A plastic breakable capsule 24 is contained in the spherical member 20 and contains a second liquid 26. In use, the outer case 20 of the ball 19 is depressed so as to rupture the plastic case 24 to allow the liquid 26 to mix with the liquid 27. Such liquids may be such as described in the above-referenced U.S. Pat. Nos. 3,576,987 and 3,597,362 and 3,704,309 and which after mixing produce light energy in the visible range. In use, such light energy enhances the lure 10 in that fish are attracted to the light from the ball 19 and can be caught by the hook 16.

A modified form of the luminous ball is shown in FIg. 5 wherein an outer plastic spherical case 28 is provided with a glass partition 29 which separates liquids 31 and 33 as shown.

A solid ball 32 is mounted in the sphere 28 so that the glass partition 29 can be ruptured by pressing the ball 32 against the partition 29 by depressing the plastic outer shell 28 to allow the liquids 31 and 33 to intermix and, thus, produce visible light output energy.

FIGS. 3 and 4 illustrate a modified form of the invention wherein the metallic elements 46 are replaced by strands 41 of fiber optics plastic material which have their ends 42 in contact with the light emitting ball 19 so as to transmit light from the ball 19 through the strands 41 to the ends of the strands so as to enhance the fish attracting capability. A body member 38 is mounted on the mid-portion 21 of the fish hook and has a band 39 which attaches the strands 41 to the hook. In the embodiment of FIGS. 3 and 4, light is emitted not only from the ball 19 when the inner container 24 is ruptured, but also from the ends of the fiber optic strands 41.

FIG. 6 illustrates another embodiment for the luminous ball 34 wherein a small ball 37 is coated with luminous paint and is surrounded with a glycerin, gelatin coating 36 over which a fish attracting scent agent is dispersed. The luminous paint is light producing. The ball 34 can be made with balls coated with different colored luminous paint and this produces a general effect of a natural fish eye. The clear glycerin gelatin portion 36 is transparent or translucent so that the light from the light emitting ball 37 will be visible externally of the ball 34. The ball 37 could be solid or hollow and in FIG. 6 is shown as a solid ball.

It is seen that this invention provides a novel fish lure and although it has been described with respect to preferred embodiments, it is not to be so limited as changes and modifications could be made therein which are within the full intended scope as defined by the appended claims.

I claim as my invention:

1. A jig comprising a fish hook, a holder attached to the shank of said fish hook and a ball detachably mounted in the holder wherein the ball is comprised of a reflective or a chemiluminescent small ball surrounded by a light transmitting gelatin coating.

2. A cold-illuminated fishing jig according to claim 1 wherein fish attracting scent agent is dispersed in said gelatin coating.

* * * * *